C. H. ZWERMANN.
MILK CAN.
APPLICATION FILED AUG. 22, 1910.
1,059,423.
Patented Apr. 22, 1913.
2 SHEETS—SHEET 2.
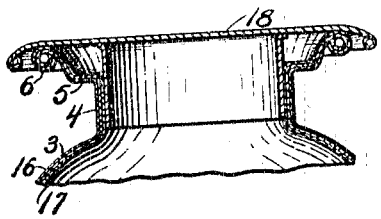
Fig. IV.
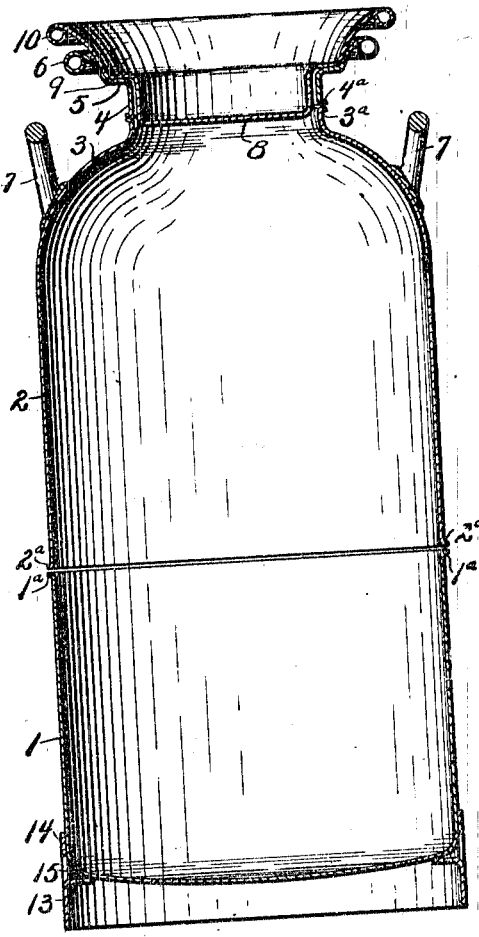
Fig. II.
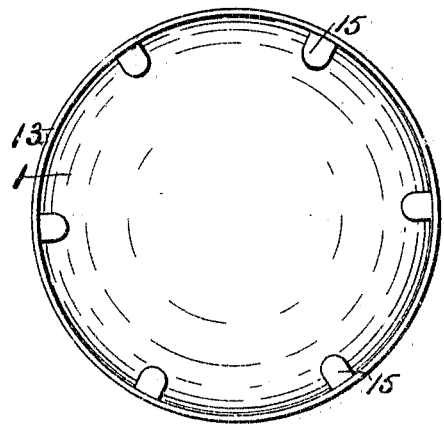
Fig. III.
Witnesses
M. P. Woodruff
M. L. Glasgow.
Inventor
Carl H Zwermann
By Chappell Earl
Attorneys

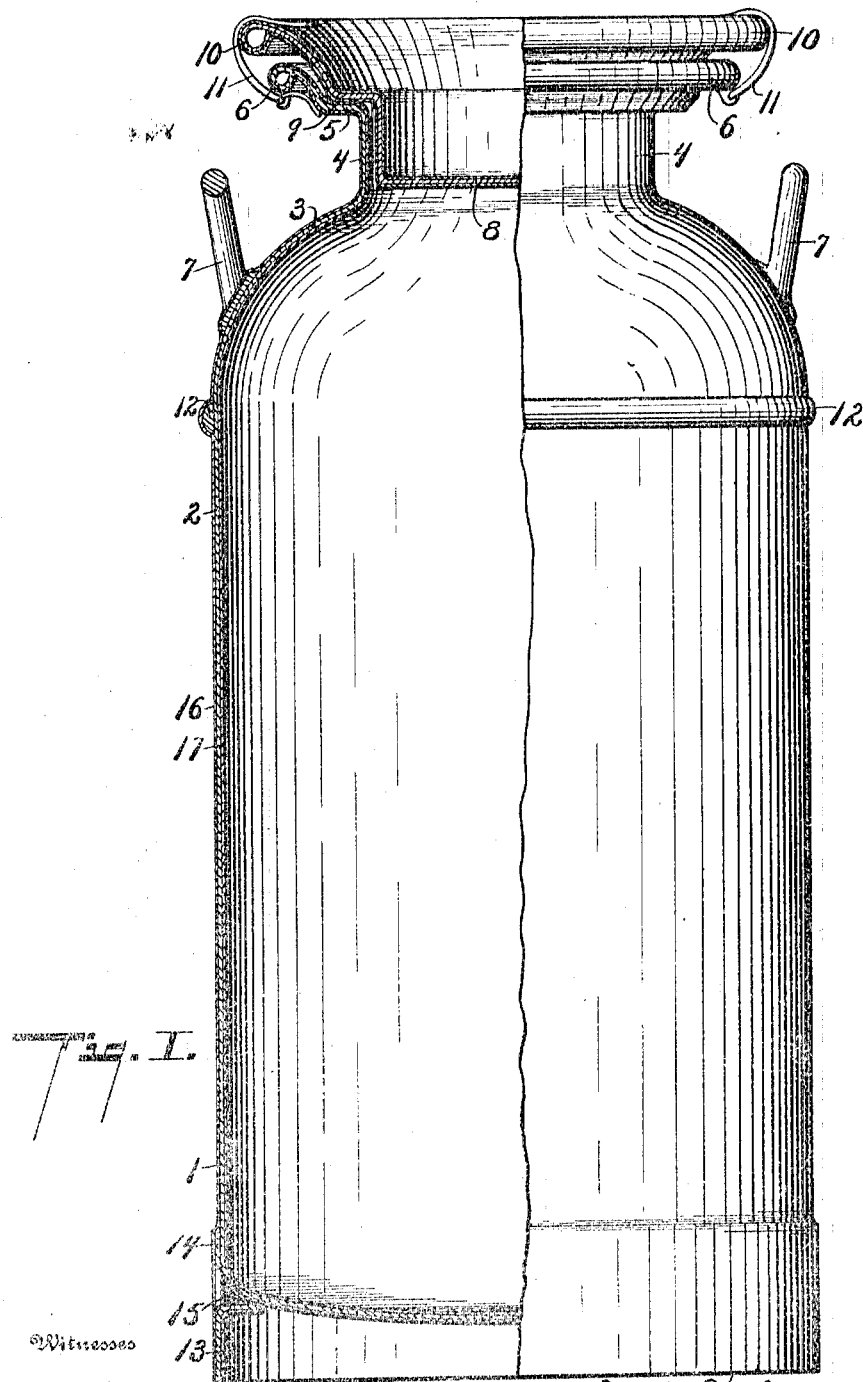

UNITED STATES PATENT OFFICE.

CARL H. ZWERMANN, OF KALAMAZOO, MICHIGAN.

MILK-CAN.

1,059,423.  Specification of Letters Patent.  Patented Apr. 22, 1913.

Application filed August 22, 1910. Serial No. 578,270.

*To all whom it may concern:*

Be it known that I, CARL H. ZWERMANN, a citizen of the United States, residing at the city of Kalamazoo, county of Kalamazoo, State of Michigan, have invented certain new and useful Improvements in Milk-Cans, of which the following is a specification.

This invention relates to improvements in milk cans.

The objects of this invention are: First, to provide an improved seamless milk can. Second, to provide an improved construction of milk can, which will have a very smooth interior, with curved surfaces only presented, whereby the can is entirely sanitary and cleanly. Third, to provide an improved construction of milk can, which lends itself readily to the welding process for organizing the same. Fourth, to provide an improved bottom for such a milk can. Fifth, to provide an improved cover for such a milk can.

A still further object is to provide a milk can, which can be very readily enameled on account of the joints being welded joints and entirely smooth, so that the enamel can spread over the same.

Further objects, and objects relating to details, will readily appear from the description to follow.

I accomplish the objects of my invention by the devices and means described in the following specification.

The invention is clearly defined and pointed out in the claims.

A structure, which is a preferred embodiment of my invention, is clearly illustrated in the accompanying drawing, forming a part of this specification, in which:

Figure 1 is a detail view, partially in section, of a milk can embodying the features of my invention. Fig. 2 is a vertical sectional view through the central part of the various blanks of sheet metal from which my improved can is constructed. Fig. 3 is an inverted plan view of the can as illustrated in Fig. 2. Fig. 4 shows an ordinary milk can cover in position in my improved milk can neck.

In the drawing, similar numerals of reference refer to similar parts throughout the several views.

The can is made up of several parts assembled together and welded, either by electric welding, or by oxyhydrogen welding, oxyhydrogen being the preferred method.

The bottom 1 of the can is made or drawn out of a single piece of sheet metal with the bottom nicely rounded and convex to make every portion of the same conveniently accessible on the inside and very strong. The upper edge of this bottom is flanged slightly outward at $1^a$ in the process of manufacture. The upper part 2 of the can is provided with an opposing flange $2^a$ for welding to the flange $1^a$ of the bottom. The breast 3 of the can is rounded and terminates in a flange $3^a$ at its upper end, being also slightly outturned. The neck 4 of the can is formed of a separate piece, formed with a shoulder 5, for contacting with my improved cover to make a tight joint at that point, and flanged outwardly into a bead 6 at its outer upper edge. The lower end of this neck is provided with an outwardly-turned flange $4^a$ for welding to the flange $3^a$ above the breast of the body portion of the can. By this arrangement and construction, it will be seen that the joints between these various parts can be very readily welded by the oxyhydrogen method, and, owing to the fact that the milk can mouth is of considerable size, the joints can be welded both outside and inside. The joint can then be smoothed down by any suitable grinding and polishing means, and the can can then be coated with enamel. This could not be done if the parts were brazed together, because the extreme heat used in applying the enamel would melt the solder.

The handles 7 are secured to the outside of the can by electric welding, the method pursued being known as the point welding method.

The can cover 8 is provided with a shouldered portion 9 corresponding to the shoulder 5 in the neck of the can and it terminates in a rim 10 at the top, whereby the same can be conveniently handled. The cover is held in place by a clamp 11, which urges the cover down and makes a tight joint between the shoulder portions 5 and 9.

Around the bottom of the can is a heavy ring 13, which closely fits the bottom of the can at 14 and has fingers or lugs 15 struck in from the same, which are welded securely to the bottom of the can. When this is done, the can is coated outside and in with enamel, the coating 16 being on the outside and the coating 17 on the inside. The can may also be coated with tin and will be very effective.

Having thus described my invention, what I claim as new and desire to secure by Letters Patent, is:

1. A milk can constructed of a bottom portion rounded and convex, and a top portion, also rounded at the breast, with a suitable welded joint between; a hoop around the bottom of the said can with fingers struck in and joined to said bottom; a neck for the said can with a suitable welded joint connected to the body of said can, as specified 2. A milk can constructed of a bottom portion rounded and convex, and a top portion, also rounded at the breast, with a suitable welded joint between; a hoop around the bottom of the said can with fingers struck in and joined to said bottom; and handles secured to the breast of said can by a welded joint, as specified.

3. A milk can constructed of a bottom portion rounded and convex, and a top portion, also rounded at the breast, with a suitable welded joint between; a hoop around the bottom of the said can with fingers struck in and joined to said bottom, as specified.

In witness whereof, I have hereunto set my hand and seal in the presence of two witnesses.

CARL H. ZWERMANN. [L. S.]

Witnesses:
 LUELLA G. GREENFIELD,
 MARGARET L. GLASGOW.